United States Patent [19]

Asquier et al.

[11] 4,305,769
[45] Dec. 15, 1981

[54] METHOD OF MANUFACTURING TIRE BEAD RINGS

[75] Inventors: Jose Asquier; Jean-Louis Charvet, both of Clermont-Ferrand, France

[73] Assignee: Compagnie Generale des Etablissements Michelin, Clermont-Ferrand, France

[21] Appl. No.: 122,183

[22] Filed: Feb. 19, 1980

[30] Foreign Application Priority Data

Feb. 19, 1979 [FR] France .................................. 79 04332

[51] Int. Cl.³ ............................................ B29H 17/32
[52] U.S. Cl. ..................................... 156/136; 140/88; 152/362 R; 156/422; 245/1.5
[58] Field of Search .................... 152/362 R; 156/136, 156/422; 245/1.5; 140/88

[56] References Cited

U.S. PATENT DOCUMENTS 3,949,800  4/1976  Lejeune .............................. 156/136
4,166,492  9/1979  Pfeiffer ............................... 156/136

Primary Examiner—John E. Kittle
Attorney, Agent, or Firm—Brumbaugh, Graves, Donohue & Raymond

[57] ABSTRACT

A method of manufacturing a tire bead ring of the package type by winding metal wires on a form of revolution, the radially inner face of the tire bead ring having a frusto-conical shape of half angle $\alpha$ at the apex and of radius R with respect to the axis of rotation of the tire bead ring, in which a permanent circular deformation is effected on the wires prior to their winding on the form of revolution, is improved due to the fact that the permanent circular deformation is a radial deformation of a radius substantially equal to the radius R of the tire bead ring and is effected on the wires whose one principal axis of inertia of their cross section is inclined by one angle $\alpha$ with respect to the axis of winding of the wires on the form of revolution.

4 Claims, 3 Drawing Figures

METHOD OF MANUFACTURING TIRE BEAD RINGS

BACKGROUND OF THE INVENTION

This invention relates to a method of manufacturing rings for reinforcing the beads of tires of the type without a separate inner tube, known also as "tubeless tires", to the use of a special wire for carrying out this method, and to rings produced by the method.

In tires, the rubber base present between the heel and the toe of the two beads has the external apperance of a frustoconical zone. Upon the mounting of the tire on a rim, the base of each bead is seated on a zone of the rim which is of suitable conicity, this zone being termed the bead seat. The base not only plays an essential role in holding the bead, that is to say the tire, firmly on the rim but, together with the bead seat, it forms the sealing joint between the tubeless tire and the rim. For this purpose, the bead seats of tires have a conicity of between about 5° and about 15°.

The tire bead rings assure the nonstretching of the bead and serve as anchoring for the carcass reinforcement. In tubeless tires there are preferably employed rings of the package type produced by winding steel wires in adjoining turns on a form of revolution consisting of the groove of a pulley. One can thus impart to the radial cross section of the ring an axial width greater than its radial height and a radially inner frustoconical face which may or may not be parallel to the bead seat. In order to stabilize the shape of the radial cross section of the ring against defects in the shaping and molding of the tire, steel wires of circular cross section have been replaced by steel wires of rectangular cross section (French Patent No. 73 08228 corresponding to U.S. Pat. No. 3,949,800). In order to obtain a radial cross section of the ring, the radially inner face of which is linear, it has been proposed to impart to the wires of rectangular cross section, prior to their winding, a permanent curvature which is directed towards the inside of the tire (German Provisional Patent No. 26 53 553).

Whatever the cross section of the steel wire used, the radial cross sections of these rings do not remain unchanged under the effect of the manufacturing forces and the stresses in use caused by the carcass reinforcement which is anchored around the rings.

These defects seem to come from the elasticity, that is to say the residual stresses stored in the steel wires during the winding of them on the form of revolution. The coherence of the elements forming the ring, seen in radial cross section, is no longer assured. The wires have a tendency to reorient the principal axis of inertia of their radial cross section, corresponding to the highest principal moment of inertia, parallel to the axis of winding of the wires. The wires then have a tendency to resume the shape which they had prior to their winding. This results not only in a disorganization of the initial structure imparted to the ring but also in empty spaces between the wires forming the ring.

SUMMARY OF THE INVENTION

The object of the invention is to remedy this state of affairs and to produce rings whose radially inner face has a predetermined conicity and the wires of which are free of residual elastic stresses resulting from their winding.

For this purpose, the method in accordance with the invention for the manufacture of a tire bead ring of the package type by winding metal wires, for instance steel wires, on a form of revolution, the radially inner face of the tire bead ring having a frustoconical shape of half-angle α at the apex and of radius R with respect to the axis of rotation of the tire bead ring, in which a permanent circular deformation is effected on the wires prior to their winding on the form of revolution, is characterized by the fact that the permanent circular deformation is a radial deformation of a radius substantially equal to the radius R of the tire bead ring and is effected on the wires whose one principal axis of inertia of their cross section is inclined by one angle α with respect to the axis of winding of the wires on the form of revolution. This angle is equal to the half-angle at the apex mentioned above.

The method of the invention makes it possible to place the wires on the form of revolution without winding stresses.

It is known that the principal axes of inertia of a cross section of a solid body through a plane form a right angle intersecting the center of gravity of the cross section. Thus, the method of the invention provides, first of all, for a rotation of the principal axes of inertia of the cross section of the wire by an angle α around the center of gravity of the cross section so as to arrange them respectively at 0° and 90° of the radially inner face of the ring.

Upon the bending operation resulting from the rotation of the principal axes of inertia, the neutral line of the cross section remains parallel to the axis of rotation of the ring, the radius of the permanent bending being perpendicular to the axis of rotation of the ring.

Thus the permanent circular deformation in accordance with the invention is produced by means of a deviated flexing of the wire extending into the region of plastic deformation of the metal.

Ordinarily the steel wires forming a ring of the package type are held together by means of collars surrounding the ring at regular intervals. When such a ring is placed on a horizontal plane and these collars removed, the wires unwind by themselves under the effect of the residual elastic stresses.

When one proceeds in the same manner with a ring manufactured in accordance with the invention, the wires retain their permanent curved shape without tending to unwind. This behavior favors the permanence of the cross section of the ring during the course of manufacture and of use of the tire.

The method of the invention is furthermore independent of the flat section of the metal wire used for the making of the ring. There is preferably employed a wire, the cross section of which has two parallel sides, as in French Patent No. 73 08228 (corresponding to U.S. Pat. No. 3,949,800). One may also use a wire of any cross section, for instance circular.

Finally, the permanent bending in accordance with the method of the invention requires only relatively simple tool equipment.

BRIEF DESCRIPTION OF THE DRAWING

The drawing shows, by way of illustration, a portion of a turn of a steel wire of a ring in accordance with the invention in radial cross section (FIG. 1) and in axial projection (FIG. 2), and also (FIG. 3) a ring manufactured by the method of the invention, seen in radial cross section.

DETAILED DESCRIPTION OF THE INVENTION

The angle α is equal to the half angle of the apex of the frustoconical zone to which the radially inner face of the ring corresponds. R is the radius of the permanent circular deformation in accordance with the invention and is equal to the radius of the ring. G is the center of gravity of the cross section, for example rectangular, of the wire; GX and GY are the principal axes of inertia which cut through the center of gravity G and are perpendicular one to the other. The neutral line GN of deviated flexure forms an angle α with the principal axis GX, in accordance with the method of the invention.

The radius R of the permanent circular deformation is equal to the length of the perpendicular to the axis of revolution OZ from the frustoconical zone of half-angle α at the apex passing through the center of gravity G of the radial cross section of the wire, the length of which is equal to the distance between that axis and that center.

Along the neutral line GN the metal has not suffered any deformation. The permanent deformation is perpendicular to the neutral line GN and directed along the axis HH′ perpendicular to GN. Predeformed in accordance with the method of the invention, the wire by itself takes its place on the form of revolution used for the making of the ring, without it being necessary to hold the wire. It is unnecessary to use numerous collars of suitable strength to maintain the coherence of the pack of wires when the ring is removed from the construction form.

Figure 1:
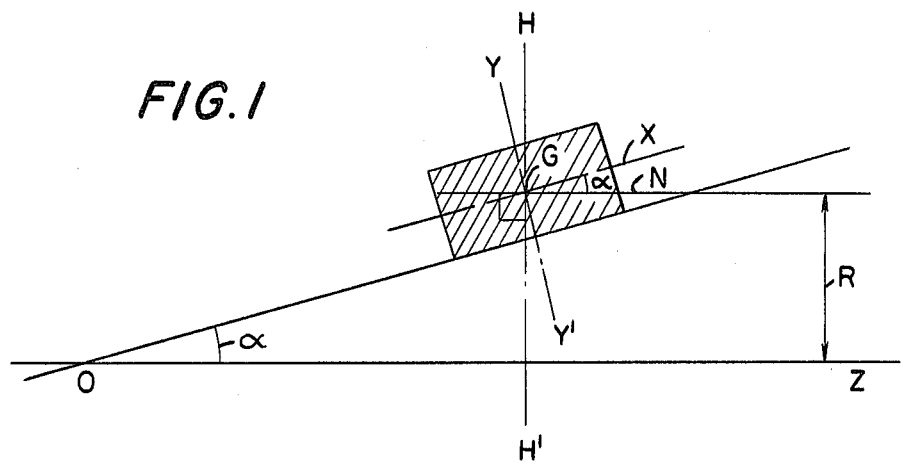
Figure 3:
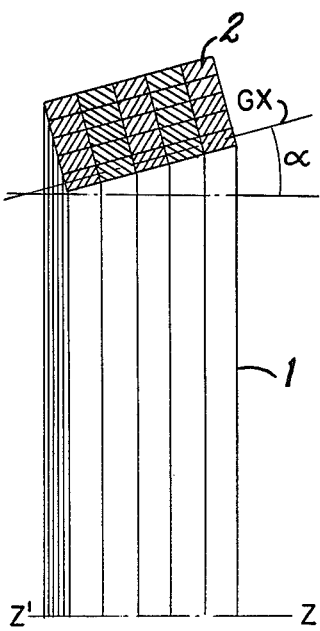
Figure 2:
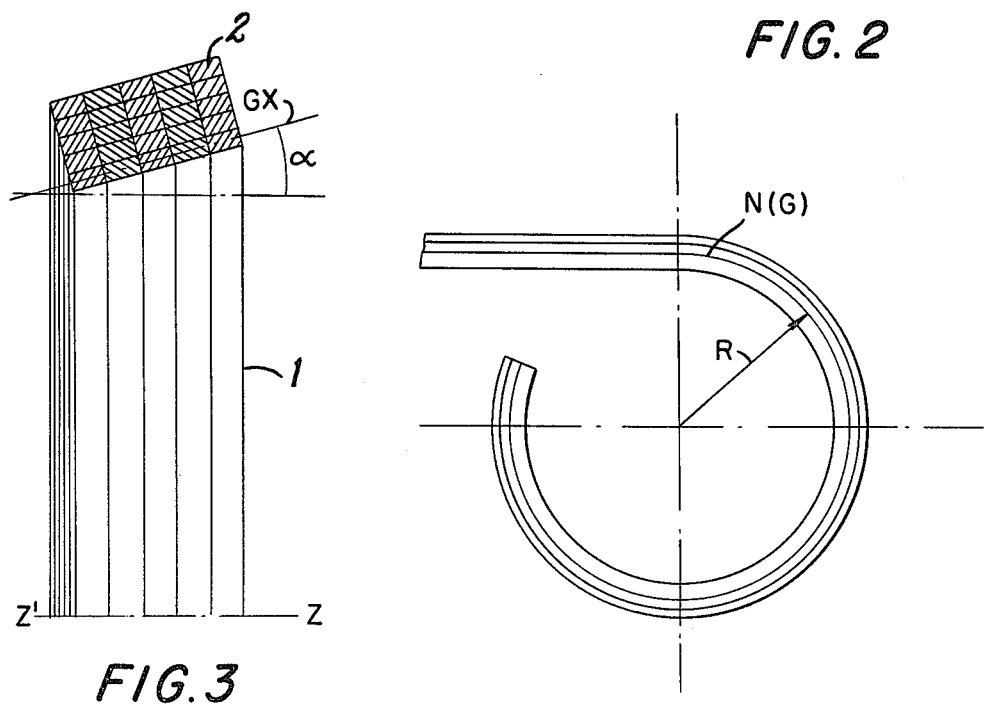

FIG. 3 shows a ring 1 manufactured in accordance with the invention, seen in radial cross section. It is composed of rectangular section wires 2 whose principal axis of inertia GX forms an angle α of 15° with the axis of rotation Z—Z′ of this ring. In accordance with the invention, the wires of rectangular section are applied one against the other without residual tension and without any interval between them and the radially inner face of the ring section is rectilinear and forms with the axis ZZ′ of the ring an angle α.

What is claimed is:

1. A method of manufacturing a tire bead ring of the package type by winding metal wires on a form of revolution, the radially inner face of the tire bead ring having a frustoconical shape of half angle α at the apex and of radius R with respect to the axis of rotation of the tire bead ring, in which a permanent circular deformation is effected on the wires prior to their winding on the form of revolution, characterized by the fact that the permanent circular deformation is a radial deformation of a radius perpendicular to said axis of rotation of said tire bead ring and substantially equal to the radius R of said tire bead ring and is effected on the wires whose one principal axis of inertia of their cross section is inclined by one angle α with respect to the axis of winding of the wires on the form of revolution, said angle α being equal to the half angle of said apex and said axis of winding being said axis of rotation of said tire bead ring, whereby the neutral line of said cross section remains parallel to said axis of rotation of said tire bead ring.

2. The method according to claim 1, characterized by the fact that the metal wires are steel wires of circular cross section.

3. The method according to claim 1, characterized by the fact that the metal wires are steel wires of rectangular cross section.

4. A tire bead ring manufactured by the method of claim 1 or 2 or 3.

* * * * *